(12) United States Patent

Smadja et al.

(10) Patent No.: US 12,688,492 B2

(45) Date of Patent: Jul. 21, 2026

(54) PAYMENT CARD, AUTHENTICATION METHOD AND USE FOR A REMOTE PAYMENT

(71) Applicant: CCS12, Marseilles (FR)

(72) Inventors: William Smadja, Marseilles (FR); Marlene Abisdid, Marseilles (FR)

(73) Assignee: CCS12, Marseilles (FR)

( * ) Notice: Subject to any disclaimer, the term of this patent is extended or adjusted under 35 U.S.C. 154(b) by 108 days.

(21) Appl. No.: 18/547,741

(22) PCT Filed: Feb. 21, 2022

(86) PCT No.: PCT/EP2022/054274

§ 371 (c)(1),
(2) Date: Aug. 24, 2024

(87) PCT Pub. No.: WO2022/179986

PCT Pub. Date: Sep. 1, 2022

(65) Prior Publication Data

US 2024/0135359 A1 Apr. 25, 2024
US 2024/0232853 A9 Jul. 11, 2024

(51) Int. Cl.

| | |
|---|---|
| *G06Q 20/38* | (2012.01) |
| *G06Q 20/34* | (2012.01) |
| *G06Q 40/02* | (2023.01) |

(52) U.S. Cl.
CPC ....... *G06Q 20/3415* (2013.01); *G06Q 20/385* (2013.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 7,210,621 B2 * | 5/2007 | Woronec | ................ | G06Q 20/24 |
| | | | | 235/375 |
| 9,830,756 B1 | 11/2017 | Getachew et al. | | |
| 9,870,528 B2 * | 1/2018 | Gautier | ................ | G06Q 20/385 |
| 12,118,547 B1 * | 10/2024 | Adam | ................... | G06Q 20/341 |
| 2005/0103837 A1 | 5/2005 | Boyer | | |
| 2009/0048971 A1 * | 2/2009 | Hathaway | ............ | G06Q 20/346 |
| | | | | 705/41 |

(Continued)

FOREIGN PATENT DOCUMENTS

| | | | | |
|---|---|---|---|---|
| EP | 2610824 A1 | 7/2013 | | |
| EP | 3474207 A1 * | 4/2019 | ........... | G07F 7/0806 |

(Continued)

*Primary Examiner* — Thien M Le
*Assistant Examiner* — April A Taylor
(74) *Attorney, Agent, or Firm* — Craft Chu PLLC; Andrew W. Chu

(57) ABSTRACT

The payment card includes at least one authentication cryptogram on one side of the card. The authentication cryptogram being unique and belonging to the payment card, is affixed to the payment card and identifies the payment card by optical recognition. The optical recognition identifier is linked to a bank account to which the payment card is linked. The method for authenticating the payment card and the bearer of the payment card is performed for a secure operation relating to personal data of the bearer of the payment card. Finally, the invention relates to a use of the authentication method to make a remote payment using the payment card.

14 Claims, 6 Drawing Sheets

(56)                    References Cited

U.S. PATENT DOCUMENTS

| 2016/0155123 A1 | 6/2016 | Song |
| 2017/0228722 A1 | 8/2017 | Szutkowski et al. |

FOREIGN PATENT DOCUMENTS

| FR | 3038256 A1 | 1/2017 |
| FR | 3111206 A1 | 12/2021 |
| WO | 2020120849 A1 | 6/2020 |

* cited by examiner

PAYMENT CARD, AUTHENTICATION METHOD AND USE FOR A REMOTE PAYMENT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention falls within the field of securing financial transactions by bank card, and more particularly remote banking payments carried out on the Internet. 2. Description of Related Art Including Information Disclosed Under 37 CFR 1.97 and 37 CFR 1.98.

It should be noted that a bank card is a card made of plastic, or of paper or cardboard, a few centimeters on each side and two millimeters thick. The card conventionally carries at least one integrated circuit capable of containing information. This integrated circuit corresponds to the chip and may contain a microprocessor capable of processing this information or be limited to non-volatile memory circuits and, optionally, a security component such as a memory card.

When making a remote payment by bank card, it is necessary to provide the "security data" of the bank card in order to carry out the financial transaction.

These security data are generally inscribed on one or the other of the faces of this chip card. Typically, a bank card comprises data for identifying a bank account and/or the owner of the bank card. These identification data are generally inscribed on the front side of the bank card. More specifically, the card number, also called PAN number, is linked to a bank account. In addition, most bank cards comprise, on the one hand, the identity of the holder of the bank card (surname and first name and/or company name). Furthermore, bank organizations also inscribe the expiration date of the payment card.

These data for identifying an account and/or the owner of the chip card are generally inscribed by printing or in relief on the front side of the bank card. Generally, these inscriptions are made by an embossing technique (front side) of the chip card or by screen printing.

The majority of bank cards also comprise a security code or a visual cryptogram affixed on the back (or rear side) of the bank card.

In practice, the owner or bearer of the bank card is prompted to provide these identification data when making an online or telephone payment.

Since the early 21st century, e-commerce and more generally online payment has grown exponentially, in terms of both the number of transactions and the financial volume of these transactions.

Faced with this increase in online payment volumes, the question of cybersecurity appears critical. Indeed, in parallel with this increase in online payments, an increase has also been observed in bank card fraud, particularly through online hacking or telephone hacking.

Among these numerous frauds, two types are distinguished; one with use of the bank card, called CP for card present, the other without a card called CNP for card not present. A fraud of the first type involves a physical theft of the bank card and the hacker, in possession of this stolen card, also has access to security data that allows him to steal the identity of the bearer of the bank card in order to carry out online payments. Visual hacking of security data may also be likened to this first type of fraud by identity theft. Indeed, visual hacking takes place in principle during a store payment, with the seller copying the security data without the knowledge of the owner/bearer of the card. The hacker is then in possession of the security data of the bank card and can perform remote transactions, either for themselves, or for reselling them to a third party.

Phishing is the second type of fraud with identity theft. This technique is undoubtedly the one which has grown more in recent years. The technique consists in convincing the victim that they are a trusted third party such as a bank or government agency, in order to extract personal information: password, credit card number, number or photocopy of the identity card, date of birth, etc. This can be done by reproducing an entire website, by sending an email or even by sending a text message. The outcome is that the hacker is in possession of the security data of the bank card that also allow him to perform transactions to their own account.

To prevent this type of fraud, bank organizations have put into place methods for securing payment by sending of a payment confirmation text message (SMS) to the mobile telephone of the bank card bearer. This text message generally comprises an alphanumeric code sent by the banking institution in order to validate the payment. This service carries the name "3D-Secure®" authentication. Although this system provides some security, it has a few weaknesses that allow hackers to bypass it. Firstly, not all banks offer such a service. Likewise, not all payment system used by merchant sites allow the use of this method for securing the financial transaction. In fact, currently only 40% of online transactions in France are approved by this system. In addition, this system can change the phone number to which the alphanumeric code is sent. This is a boon for the hacker, who can thus divert the sending of the alphanumerical code to their own telephone.

These drawbacks have pushed the European Commission, in a recent decision, to establish new, stricter European standards that require a higher security level as regards online payments. The ambitious calendar of applying these new standards aimed to make them effective in 2021, with a major drawback, namely allowing the banks to choose their own solutions, with the risk of non-standardization.

Alternative solutions exist to secure transactions. For example, there is a type of bank card that comprises a dynamic CVV cryptogram. The CVV cryptogram corresponds to the series of three digits which is generally on the front side of the bank card.

The CVV cryptogram is called dynamic, since the series of three digits changes randomly, automatically and regularly. Thus, it is possible to trust the information from a dynamic bank card for online transactions without worry. Indeed, even in the case of phishing, the security data of the bank card will be unusable, since the cryptogram changes regularly.

Bank cards with a dynamic cryptogram are only a partial response to the problem of phishing. However, it does not meet the problem of physical theft of the bank card. In addition to the fact that the technique embedded in such a card is technologically advanced, in particular through the integration of both a battery and a screen in the thickness of the card, this technology is very costly and non-ecological, which has delayed its universal adoption.

It should be noted that the applicant already proposes a solution for combating identity theft following physical theft of the bank card and/or visual hacking. The solution proposes integrating a cryptogram instead of the three digits of the PAN number of the bank card. This solution is described in particular in document WO 2020/120849. Although in possession of the bank card, the hacker does not have all the security data needed to make online payments on their own. Indeed, the holder of this type of bank card receives, on the one hand, a bank card, a part of PAN number of which is concealed, and on the other hand, the concealed number. This concealed number can be revealed by a digital method also developed by the applicant which has also been the subject of a patent application FR 20 05961.

Although this solution to encrypt the PAN number of the bank card has proven effective against the physical theft and/or visual piracy of a bank card, it does not make it possible to prevent the phishing of the security data of the bank card.

Consequently, at the time of drafting the present document, it is noted that banking organizations and online merchants have not yet found an appropriate solution to secure online transactions by bank cards.

BRIEF SUMMARY OF THE INVENTION

To overcome these drawbacks, the applicant has developed a technical solution that aims to secure online payment through two-factor authentication ensuring the authentication of the bank card and the holder of said bank card.

A first aspect of the present invention relates to a payment card comprising a front side and a back side, the payment card also includes an electronic chip, the front side comprising security data which include at least one PAN number, an identity of the bearer of the payment card, and an expiration date of the payment card, the back side having a CVV cryptogram generally consisting of three digits.

The payment card is characterized in that it comprises on at least one side an authentication cryptogram comprising a number of characters between 200 and 10,000, this authentication cryptogram is unique and belongs to the payment card on which the authentication cryptogram is affixed, said authentication cryptogram forms a means of identifying the payment card by optical recognition, said identification means being linked to a bank account to which the payment card is linked.

The payment card according to the invention is equipped with its own authentication cryptogram that is affixed on a side of the payment card. This authentication cryptogram comprises a large number of characters, making it unique. In fact, the authentication cryptogram contributes to providing a means for authenticating the payment card by optical recognition of the authentication cryptogram. This authentication cryptogram contributes to improving the security of secure transactions, by limiting phishing fraud. Indeed, when a hacker has succeeded in deactivating the security data of the payment card, an authentication method according to the invention requires the validation of the secure transaction by optical recognition of the authentication cryptogram. Thus, if the hacker is not in possession of the payment card and its security data, that person cannot use the payment card for their own benefit.

According to a second feature of the first aspect of the invention, the authentication cryptogram is a matrix code forming a determined number of black modules arranged against a white background so as to form a unique pattern, each black module forming a character of the authentication cryptogram. This type of matrix code provides a large number of combinations that allows each payment card to comprise a unique authentication cryptogram, which is also said to "belong" to that card.

According to a third feature of the first aspect of the invention, the PAN number consists of four series of four digits, the payment card comprising a PAN cryptogram replacing at least one series of four digits of the PAN number. The PAN cryptogram provides additional security that makes it possible to combat physical theft and/or visual piracy of the payment card. Indeed, even in the event of physical theft and/or visual piracy, the hacker does not have the entire PAN number of the payment card. The card is consequently unusable.

In particular, the PAN cryptogram comprises between 16 and 100 characters, preferably, the PAN cryptogram comprises between 36 and 64 characters. According to the invention, the PAN cryptogram is a Cardan grille.

According to a fourth feature of the first aspect of the invention, the CVV cryptogram can be substituted by a cryptogram having a number of characters greater than three. This feature is also aimed at concealing the security data of the payment card in order to combat the physical theft and/or visual piracy of the payment card.

A second aspect of the invention relates to a method for authenticating a payment card as defined according to the first aspect of the invention, and the bearer of that payment card. The authentication method is aimed at performing a secure operation relating to personal data of the bearer of the payment card. In this respect, the authentication method comprises at least:

a) A first step of authenticating the payment card by entering security data of the payment card and/or a first authentication of the bearer of the payment card, the bearer of the payment card entering their own identity and/or an identifier;

b) A step of requesting a secure operation relating to personal data of the bearer of the payment card, the request carried out with a secure digital space linked to the bank account of the payment card that is open with a banking institution, the secure digital space being stored on a remote server managed by the banking institution;

c) A step of verifying the entered security data of the payment card, this step being carried out by comparing the entered security data with reference data stored on the secure digital space;

d) A second step of authenticating the payment card and the bearer of the payment card, the second authentication step being carried out by recognition of the authentication cryptogram belonging to the payment card, this step being carried out through a digital recognition module available or accessible via a digital terminal belonging to the bearer of the payment card, and e) A step of finalizing the secure operation relating to personal data of the bearer of the payment card.

Through the two authentication steps a) and d), the method according to the invention has incorporated two-factor authentication of the payment card and/or of the bearer of said card. This two-factor authentication strengthens the securing of a secure transaction such as a remote payment. Indeed, this method involves entering the security data of the payment card, but also that the bearer of this card performing this transaction must open the recognition module, and finally that the bearer of the payment card must be in possession of their payment card for the cryptogram belonging to the payment card to be recognized. In fact, the authentication method renders phishing as it currently exists ineffective, since this type of hacking does not make it possible to recover the authentication cryptogram belonging to the payment card.

According to a first feature of the second aspect of the invention, the second authentication step d) is carried out by opening a secure communication channel between the secure digital space of the bank account and the digital terminal of the bearer of the payment card, the secure digital space of the bank account then calling for the opening of the digital recognition module.

According to a second feature of the second aspect of the invention, the authentication method comprises, upon the opening of the recognition module, a biometric and/or code authentication operation of the bearer of the payment card; in the event of successful authentication of the bearer of the payment card, the recognition module gives access to a camera of the digital terminal to allow a digital capture of the authentication cryptogram of the payment card.

According to a third feature of the second aspect of the invention, the method comprises comparing the authentication cryptogram affixed to the payment card, with a digital image of the authentication cryptogram stored in the secure digital space of the bank account.

According to a fourth feature of the second aspect of the invention, when the connection step a) is carried out in a secure online portal separate from the secure digital space 6, a secure communication channel is opened between the secure online portal and a secure digital space and linked to the bank account of the payment card.

According to a fifth feature of the second aspect of the invention, the authentication method comprises a step of geolocation of the digital terminal of the bearer of the payment card.

A third aspect of the invention relates to a use of the authentication method defined according to the second aspect of the invention, to validate a remote payment and in particular to a remote payment carried out via a website, the remote payment being made through a payment card defined according to the first aspect of the invention.

BRIEF DESCRIPTION OF THE SEVERAL VIEWS OF THE DRAWINGS

Other features and advantages will become apparent in the following detailed description of two non-limiting exemplary embodiments of the invention, which is shown by the enclosed FIGS. 1 to 6.

DETAILED DESCRIPTION OF THE INVENTION

Figure 1:
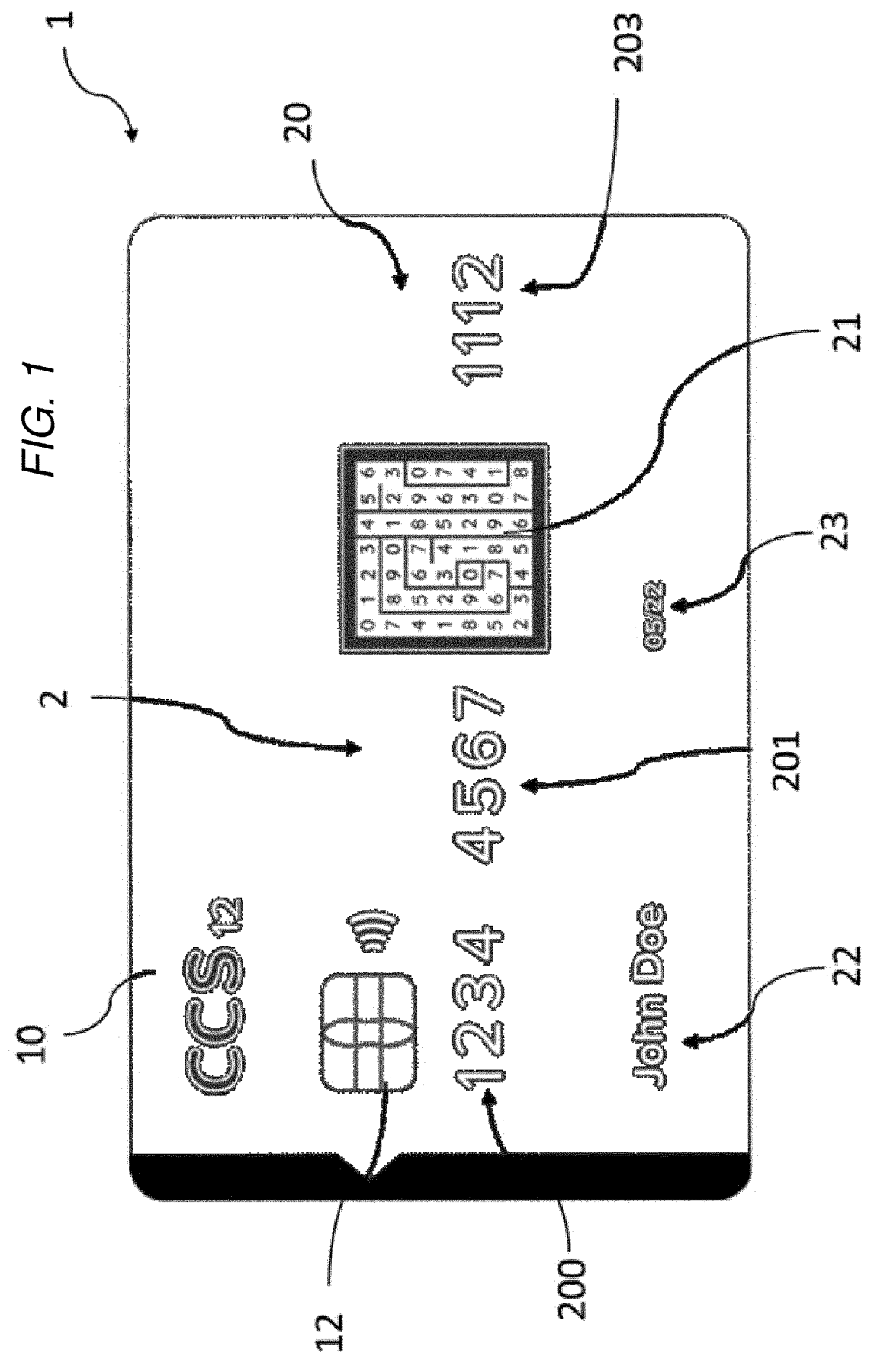
FIG. 1 is a schematic view of a representation of a front side of a payment card according to the invention.

As shown in FIGS. 1 to 5, the invention relates to a payment card 1. This payment card 1 corresponds to a bank card. In fact, the payment card 1 according to the invention is connected to a bank account opened with a banking institution. The bank account and the payment card 1 are assigned to a user, also called the owner of the bank account, or bearer 100 of the payment card 1.

The payment card 1 comprises a front side 10 and a back side 11. Conventionally, the payment card 1 also integrates an electronic chip 12. This electronic chip 12 comprises a processor and a memory configured to execute an algorithm and/or store data.

As shown in FIG. 1, the front side 10 comprises security data 2. The security data 2 include at least one PAN number 20. The PAN number 20 is composed of several series of digits, for example four series of four digits, making sixteen digits in total. The term "PAN" is common in banking jargon. In this example, by reading the payment card 1 from left to right, the PAN number 20 comprises a first series 200 of digits, a second series 201 of digits, a third series of digits and a fourth series of digits 203.

As shown in FIG. 1, it is possible to replace at least one series of four digits of the PAN number 20 with a PAN cryptogram 21. In this example, the PAN cryptogram 21 replaces the third series of digits of the PAN number 2. However, alternatively, it is possible that the PAN cryptogram 21 replaces the fourth series 203 of digits of the PAN number 2.

According to the invention, the PAN cryptogram 21 comprises between 16 and 100 characters. Preferably, the PAN cryptogram 21 comprises between 36 and 64 characters. In the example of FIG. 1, the PAN cryptogram 21 consists of a Cardan grille. Nevertheless, it is quite possible to envisage the use of another type of PAN cryptogram 21 such as a linear barcode or a matrix barcode.

It should be noted that this technique of encryption of the PAN number using the Cardan grille as a PAN cryptogram 21 is described in more detail in international application WO 2020/120849 filed by the applicant. Additionally, a method for digitally revealing the encrypted series of digits is described in the published patent application FR 20 05961 also filed by the applicant. As described in the introduction, the encryption of a series of digits of the PAN number 21 effectively makes it possible to combat identity theft fraud, in particular following a physical theft of the payment card.

As shown in FIG. 1, the security data 2 also comprises the identity 22 of the bearer 100 of the payment card 1. In addition, the security data 2 comprises an expiration date 23 of the payment card 1.

Conventionally, the security data 2, 20, 21, 22, 23 affixed to the front side 10 of the payment card 1 are inscribed by printing and/or embossing, or even by screen printing onto the surface of the payment card 1. In this example, with the exception of the PAN cryptogram 21 that is printed, the other security data 2, 20, 22, 23 are affixed by embossing.

Figure 2:
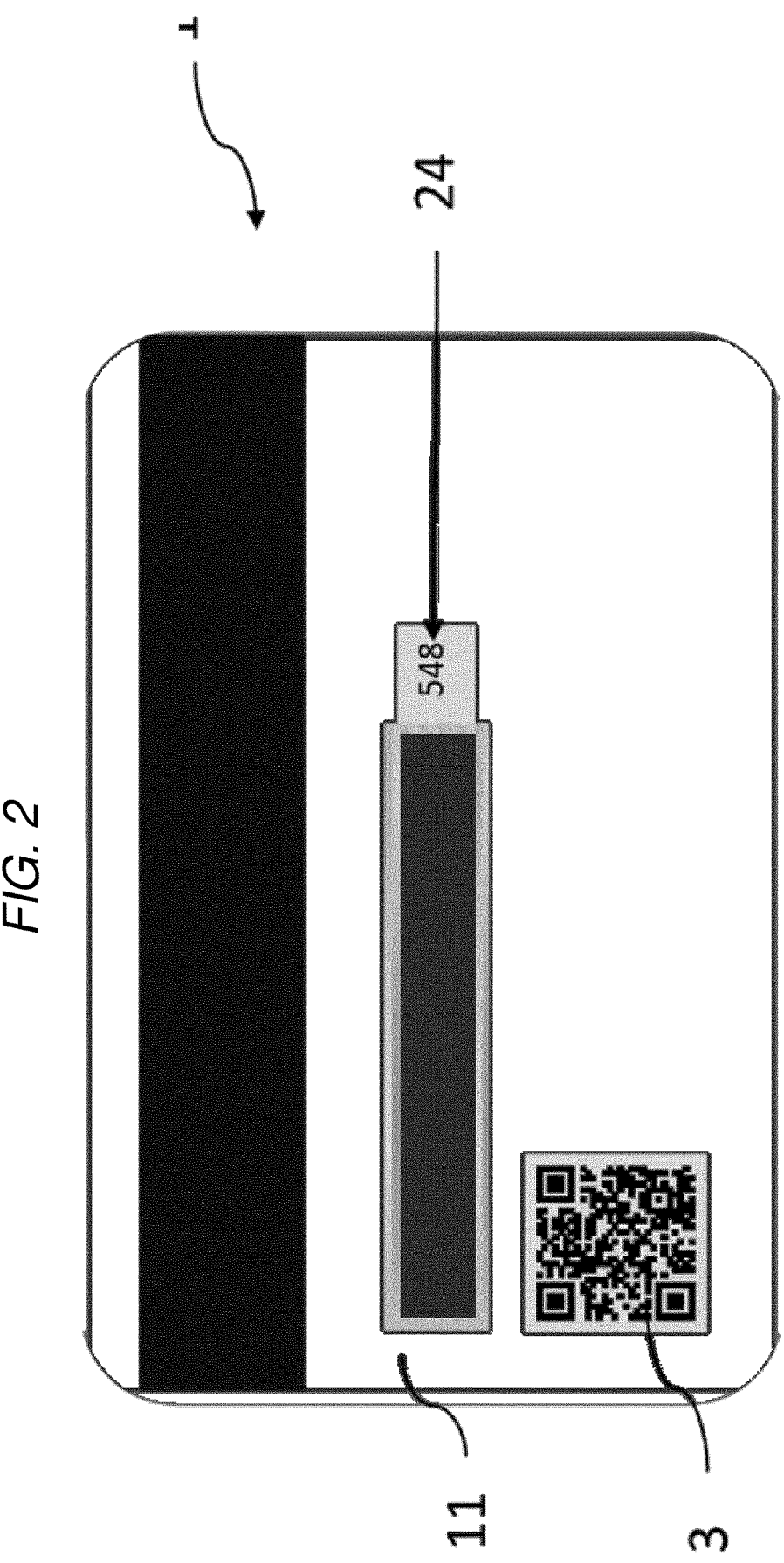
FIG. 2 is a schematic view of a representation of a back side of the payment card of FIG. 1.

As shown in FIG. 2, the back side 11 has a CVV cryptogram 24. This CVV cryptogram 24 is generally three digits. Optionally, it is also possible to replace the CVV cryptogram 24 with a cryptogram having a number of characters greater than three. By way of information, a cryptogram such as a Cardan grille, linear barcode or matrix barcode can be used to substitute the CVV cryptogram 24.

The CVV cryptogram 24 also takes advantage of the security data 2 of the payment card 1. It is referred to as security data since, during a remote payment, these security data 2 are used to authenticate the payment card 1 with the banking management institution.

According to the invention, the payment card 1 comprises at least one authentication cryptogram 3. It is unique and belongs to the payment card 1. This authentication cryptogram 3 constitutes a means for authenticating the payment card 1 by optical recognition. It is linked to the bank account of the payment card 1.

The authentication cryptogram 3 can be affixed on one side 10, 11 of the payment card 1. In the example of FIG. 2, the authentication cryptogram 3 is affixed on the back side 11. However, the authentication cryptogram 3 could also be available on the front side 10 of the payment card 1.

According to the invention, the authentication cryptogram 3 comprises a number of characters between 200 and 10,000.

Figure 4:
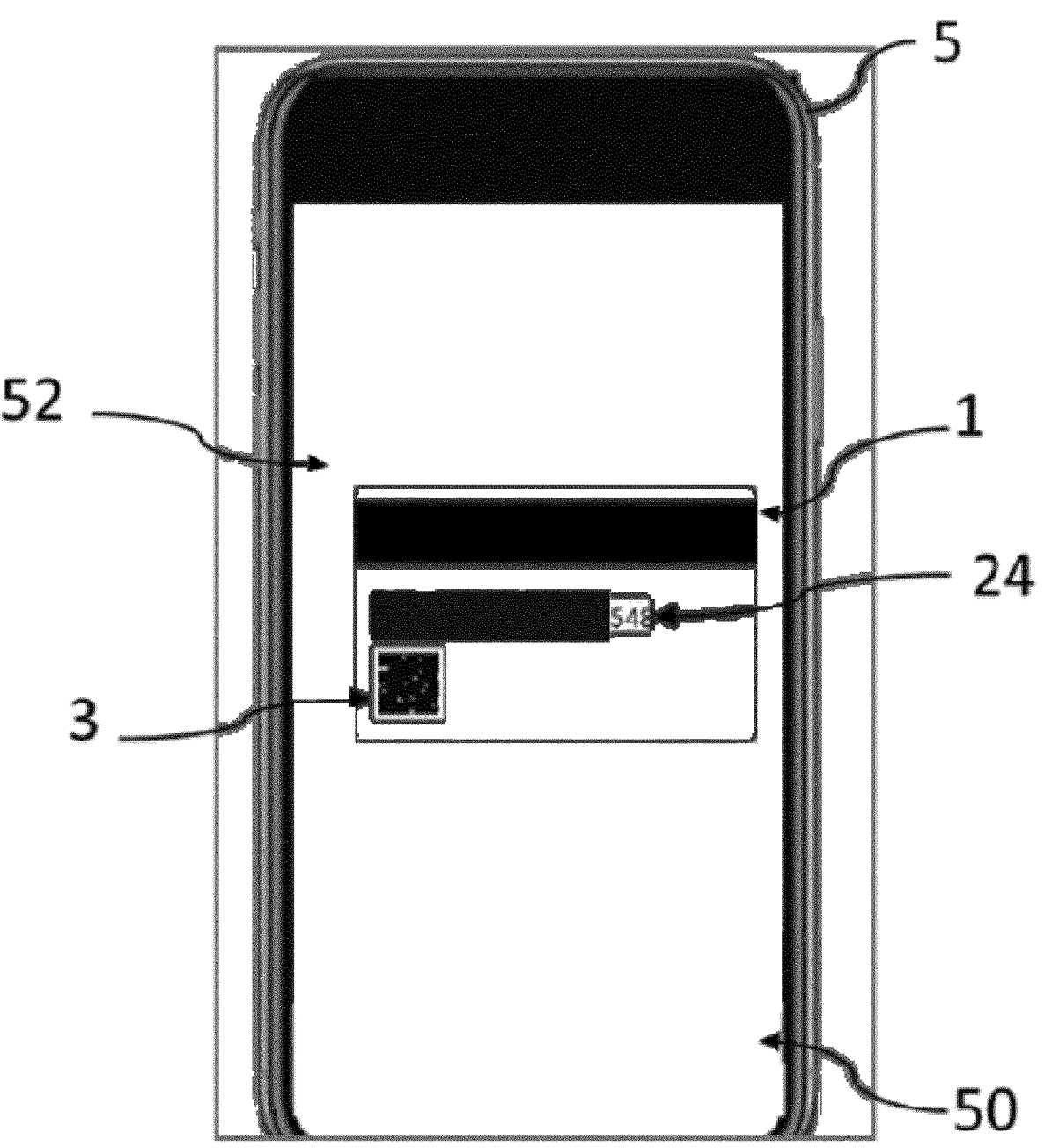
FIG. 4 is a schematic view of a representation of a step of recognition of the authentication cryptogram of the payment card of FIGS. 1 and 2.
Figure 5:
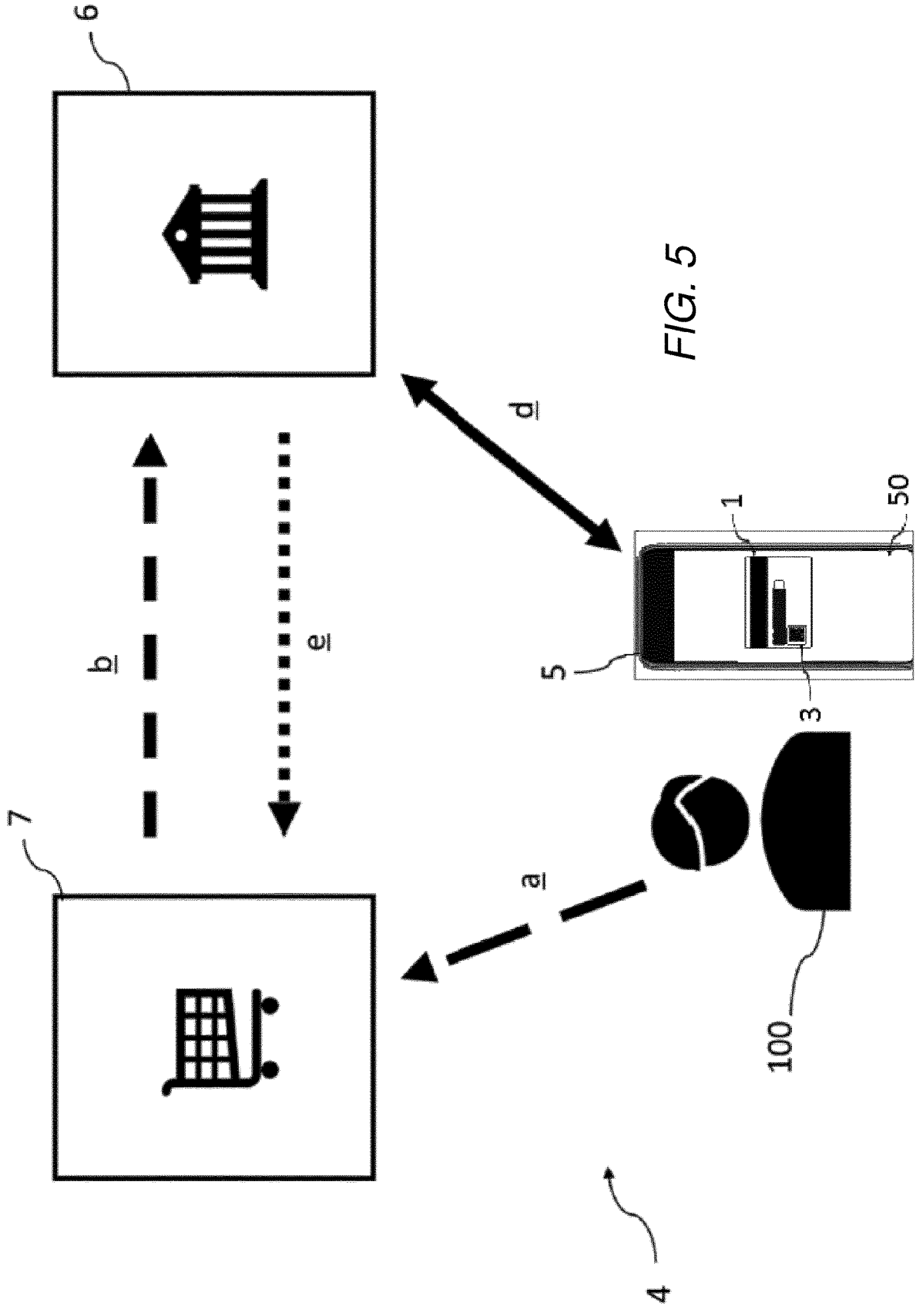
FIG. 5 is a schematic view of a representation of a system and a method for authenticating a payment card according to a first exemplary embodiment of the invention.

In the example shown in FIGS. 2, 4 and 5, the authentication cryptogram 3 consists of a matrix code. The matrix code is also called a "two-dimensional barcode". In practice, the matrix code consists of a determined number of black modules arranged against a white background so as to form a single pattern. As such, each black module constitutes one character of the authentication cryptogram 3. Each black module has determined dimensions. This type of matrix code is known as a QR Code®. The high number of characters in the authentication cryptogram 3 gives it its unique character.

It should be noted that the authentication cryptogram 3 could be formed by another type of visual cryptogram such as a holographic cryptogram, a Cardan grille, etc. The advantage of a cryptogram of the data matrix type lies in its already-established ability to be read and recognized by a smartphone and current banking applications.

Figure 6:
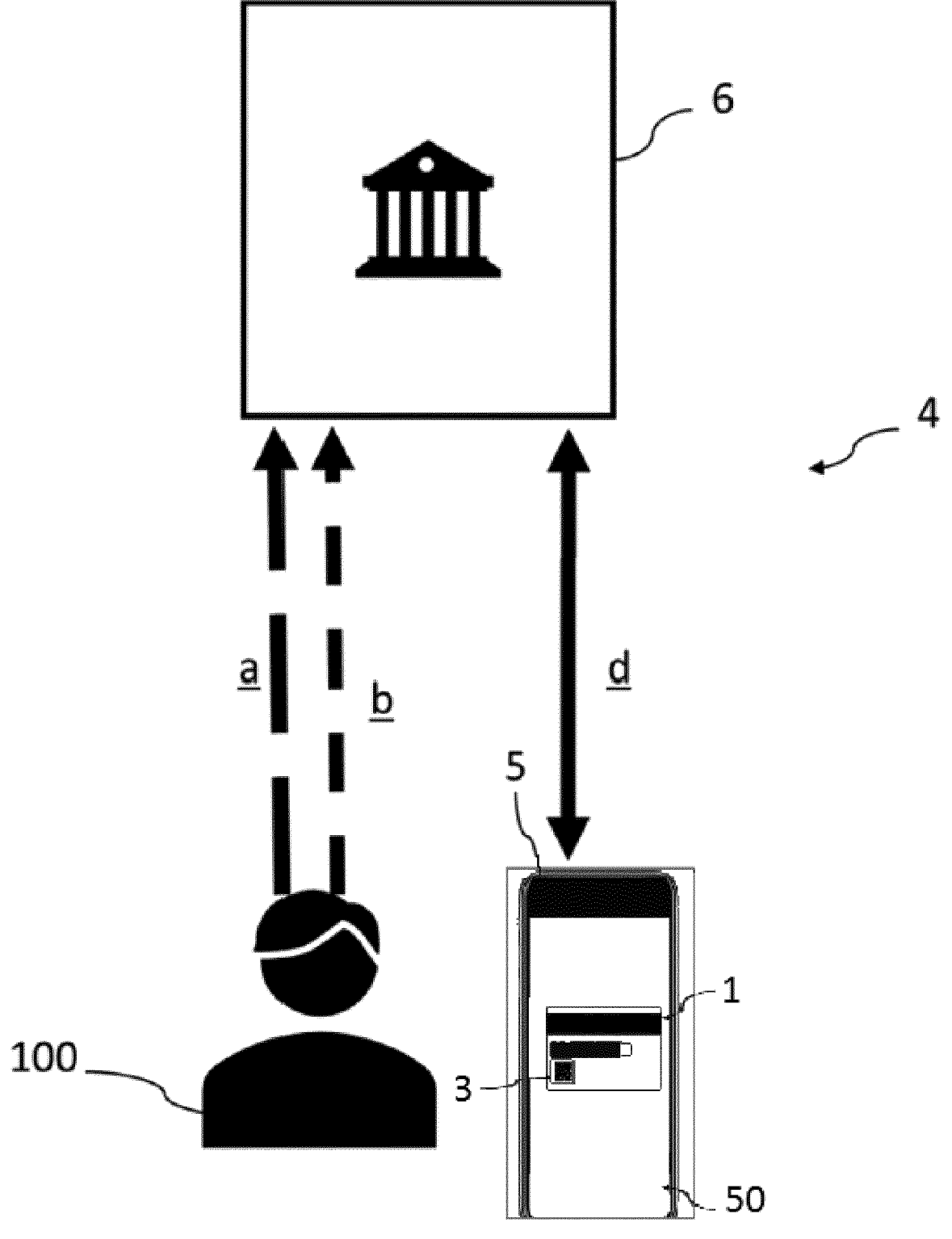
FIG. 6 is a schematic view of a representation of a system and a method for authenticating a payment card according to a second exemplary embodiment of the invention.

As shown in FIGS. 5 and 6, the invention also relates to an authentication system 4 of a payment card 1 and of the bearer 100. The authentication system 4 comprises a payment card 1, an authentication cryptogram 3 and a digital terminal 5. The payment card 1 can be comprised of a front side 10, a back side 11, and an electronic chip 12, the payment card being linked to a bank account of a bearer 100 to whom the payment card belongs. The front side is comprised of security data 2 comprising at least one primary account number (PAN number) 20, an identity 22 of the bearer, and an expiration date 23 of the payment card. The back side is comprised of a card verification code 24 (CVV code) that is comprised of three digits. The authentication cryptogram 3 is unique to the payment card and is affixed to the payment card. The digital terminal 5 belongs to the bearer and has a digital recognition module 50 in communication with a secure digital space 6 so as to identify the authentication cryptogram in the secure digital space by optical recognition through the digital terminal and finalize a secure operation relating to the bank account. The two-factor authentication of the bearer 100 and its payment card 1 contributes to performing a secure operation relating to personal data of the bearer 100 of the payment card 1. For example, the secure transaction may correspond to a remote payment carried out using the payment card 1 (FIG. 5). This two-factor authentication is more particularly useful for remote payment via the Internet. However, two-factor authentication can also be used to perform a digital signature, a transaction on a loyalty account, a transfer of banking funds, etc.

In the example of FIGS. 5 and 6, the authentication system 4 comprises a digital terminal 5. The digital terminal 5 may consist of a smartphone, a digital tablet, etc. More broadly, it is possible to implement the invention with an electronic device equipped with display means such as a screen, a multimedia capture tool such as a still or video camera, a memory, and a processor in order to store and execute algorithmic applications. The electronic device may also comprise means for communications through a telecommunication network such as a mobile telephony network, a wired telephony network, the Internet etc.

According to the invention, the digital terminal 5 incorporates a module 50 for recognition of the authentication cryptogram 3 belonging to the payment card 1. The recognition module 50 is configured for a digital capture of the authentication cryptogram 3. For these purposes, the recognition module 50 is integrated into an application system configured to take control of the camera of the digital terminal 5. By way of example, the recognition module 50 can be integrated into an application for managing the bank account linked to the payment card 1. This application for managing the bank account is of course stored and executed by the digital terminal 5. It should be noted that as of this writing, each banking institution makes a banking management application available to their clients. The recognition module 50 is therefore an algorithmic brick which can be added to an already pre-existing application or correspond to an application algorithm itself.

The digital terminal 5 is configured to communicate remotely through a wireless communication network. To this end, the digital terminal 5 may comprise communication means such as a mobile telephony transceiver. By way of example, the transceiver may be of the GSM, 2G, 3G, 4G, 5G, 6G type. Additionally, the digital terminal 5 may comprise a near-field transceiver, such as Bluetooth, Wi-Fi or other. It should be noted that most digital terminals comprise a Wi-Fi transceiver and a Bluetooth transceiver. Furthermore, mobile telephones or smartphones further comprise a mobile telephony transceiver.

As shown in FIGS. 5 and 6, the authentication system 4 according to the invention further comprises a secure digital space 6. The secure digital space 6 is linked to the bank account of the payment card 1. In general, the secure digital space 6 is managed by a banking institution managing said bank account of the bearer of the payment card 1. The secure digital space 6 is stored by a remote server. In a known manner, this secure digital space 6 is accessible remotely via secure protocols, such as the service call. This service call is of the same type as that which is used by electronic payment terminals (EPTs) to perform banking payments after reading a bank payment card.

Typically, a service call can be secured by a security protocol such as APA, HTTPS, or OAuth2.

The secure digital space 6 is also configured to open a secure communication channel using a payment validation system, of the PSP or "Payment service provider" type, for example. Such a PSP payment validation system corresponds to an application programming interface also called "API". The API of this payment validation system is configured to open a secure communication channel between the secure digital space 6 and the holder of the bank account, in order to confirm a remote payment. In this example, the payment validation system used is configured to establish secure communication between the secure digital space 6 and the digital terminal 5 of the bearer 100 of the payment card 1 linked to said bank account.

In the example shown in FIG. 5, the authentication system 4 may comprise a secure online portal 7. The online portal 7 is itself stored on a remote server that is separate from the banking server. In this example, the online portal 7 is configured to communicate with the remote server storing a secure digital space 6 of a bank account. When the bearer 100 wishes to perform an online payment transaction, the online portal 7 is a payment portal hosted on a website such as a merchant site.

According to the invention, the online portal 7 is configured to perform a secure operation relating to personal data of the bearer 100 of the payment card 1. Said secure transaction may correspond, as described above, to a remote payment, a digital signature, a transaction on a loyalty account, a transfer of banking funds, etc.

In the example of FIG. 6, the online portal 7 can be one and the same as the secure digital space 6. This possibility is more specific to a bank transfer transaction or a transaction on a loyalty card. In this configuration, the bearer 100 communicates directly with their digital terminal 5 via the secure digital space 6.

Thus, in the context of the authentication system 4, the secure digital space 6 is configured to communicate remotely through a wireless communication network with the digital terminal 5 and/or the online portal 7. In all cases, the secure operation relating to personal data of the bearer 100 is carried out after two-factor authentication of the payment card 1 and of the bearer 100 of the payment card 1. The method for performing secure operations, can comprise the step of entering security data of a payment card 1 of the authentication system 4 into a secure online portal 7. The method can further include sending a request for a secure operation from the secure online portal 7 to a secure digital space 6 being stored on a remote server managed by a banking institution linked to the bank account of the bearer 100 and verifying the entered security data with the banking institution by comparing the entered security data with reference data stored in the secure digital space 6 as a first authentication by entered security data. The method can also include recognizing the authentication cryptogram through the digital recognition module 50 of the digital terminal 5 as a second authentication in the secure digital space 6. The secure operation is finalized by approving the request for the secure operation from the secure online portal 7 with the secure digital space 6.

In practice, the authentication system 4 involves a first conventional authentication in all online payment transactions. This first authentication corresponds, on the one hand, to an authentication of the bearer 100 by its connection to a personal digital space. This authentication of the bearer 100 comprises entering an identifier and a password or else biometric recognition. On the other hand, the first authentication also involves information regarding security data 20, 21, 22, 23, 24, 200, 201, 203 of the payment card 1. It should be noted that in the present example, the PAN number 20 comprises a PAN cryptogram 21. When the bearer 100 does not have the series of digits replaced by the PAN cryptogram 21 in its memory, the bearer 100 can reveal this series of digits via a visualization method described by the French patent application FR 20 05961 also held by the applicant. In the example of FIG. 5, the first authentication is carried out by connecting to an online portal 7. Conversely, in the example of FIG. 6, the first authentication is carried out directly from the secure digital space 6 linked to the payment card 1.

Secondly, the authentication system 4 involves a second authentication. This second authentication takes place through a secure communication channel open between the secure digital space 6 and the digital terminal 5 of the bearer 100 of the payment card 1.

In practice, this second authentication corresponds, on the one hand, to an authentication of the bearer 100 by entering a password or by biometric recognition via the recognition module 50. When the authentication of the bearer 100 of the payment card 1 is successful, the recognition module 50 performs a second authentication of the payment card 1. This second authentication involves reading or capturing the authentication cryptogram 3 of the payment card 1. In fact, this two-factor authentication is a condition for approving the secure transaction, because the bearer 100 is in possession of their payment card 1 during the validation of the transaction. In the absence of biometric data of the bearer 100 or authentication cryptogram 3, a hacker cannot validate the secure transaction. Furthermore, an additional security level is conferred by a payment card 1 equipped with a PAN cryptogram 21.

The invention also relates to a method for authenticating a compliant payment card 1 of the invention and of the bearer 100 of this payment card 1. This authentication is carried out in order to carry out a secure operation relating to personal data of the bearer 100 of the payment card 1. According to the invention, this authentication method can be used to approve a remote payment, and in particular a remote payment carried out via a website. However, the method according to the invention can also be useful to perform a financial transaction, a transaction on a loyalty account, a digital signature, etc.

As shown in FIGS. 5 and 6, the authentication method comprises a first step of authenticating the payment card 1 and the bearer 100 of the payment card 1. This first authentication step is called a). During this step a), the bearer 100 enters the security data 20, 21, 22, 23, 24, 200, 201, 203 of the payment card 1. In practice, step a) may also involve an authentication of the identity of the bearer 100 of the payment card 1. This authentication is carried out by connecting to a secure digital space. The connection involves entering an identifier accompanied by an access code and/or biometric recognition. The biometric recognition can be digital or facial. This functionality depends on the features integrated into the digital terminal 5 of the bearer 100 of the payment card 1.

As shown in FIGS. 5 and 6, the authentication method comprises a step of requesting a secure operation relating to personal data of the bearer 100 of the payment card 1. The request step is denoted b). According to the invention, the request is made with a secure digital space 6 linked to the bank account of the payment card 1. This bank account is of course open with a banking institution. In this example, the secure digital space 6 is stored on a remote server managed by the banking institution. As described above, the secure digital space 6 is accessible remotely through current telecommunication means (Internet, mobile telephony).

The authentication method comprises a step of verifying the entered security data 20, 21, 22, 23, 24, 200, 201, 203 of the payment card 1. This step is denoted c). The verification step c) is carried out by comparing the entered security data 20, 21, 22, 23, 24, 200, 201, 203 with reference data stored in the secure digital space 6. When this step is successful, the method according to the invention calls for a second authentication in order to validate the operation relating to personal data of the bearer 100 of the payment card 1.

For these purposes, the authentication method comprises a second step of authenticating the payment card and the bearer of the payment card. This second authentication step is denoted d). According to the invention, the second authentication step is carried out by recognition of the authentication cryptogram 3 of the payment card 1.

In this example, step d) is carried out through a digital recognition module 50 available or accessible to the digital terminal 5 belonging to the bearer 100 of the payment card 1. In practice, the second authentication step d) is carried out by opening a secure communication channel between the secure digital space 6 and the digital terminal 5 of the bearer 100 of the payment card 1. Such a secure communication channel can use a PSP system described above. In practice, the secure digital space 6 of the bank account calls the opening of the digital recognition module 50 on the digital terminal 5 of the bearer 100 of the payment card 1.

Figure 3:
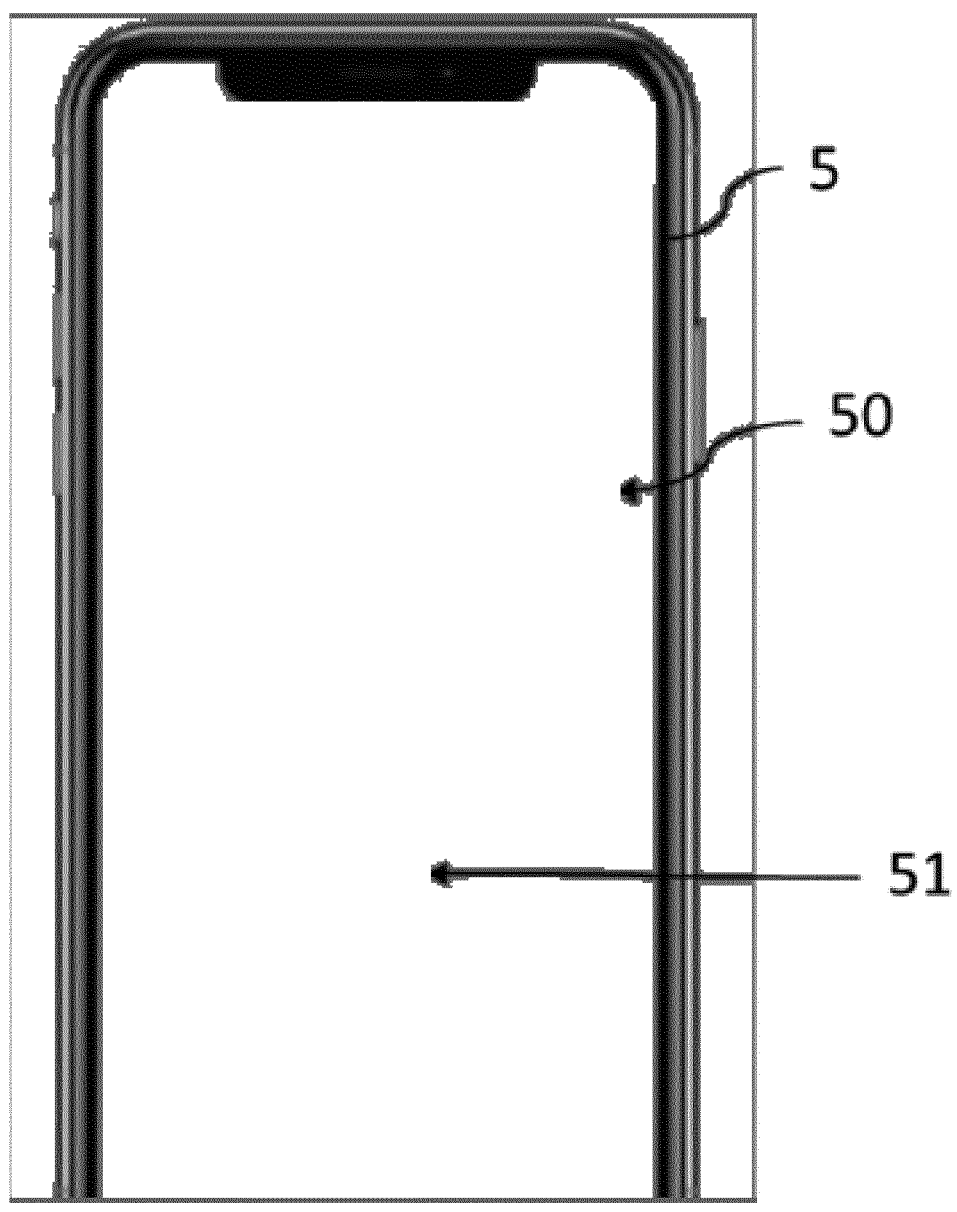
FIG. 3 is a schematic view of a representation of a digital terminal receiving a call from a banking server in order to authenticate a payment card.

As shown in FIG. 3, when the recognition module 50 is opened, the method may comprise a biometric and/or codified authentication transaction of the bearer 100 of the payment card 1. In this example, biometric authentication by recognition of a fingerprint 51 is requested. In the event of the authentication of the bearer 100 of the payment card 1, the recognition module 50 gives access to a camera of the digital terminal 5 to allow a digital capture of the authentication cryptogram 3 belonging to the payment card 1 (see FIG. 4). The recognition module 50 comprises a frame 52 in the payment card 1 must be placed through the screen of the digital terminal 5. It should be noted that the recognition module 50 asks to scan the payment card 1.

The second authentication step comprises a transaction of comparing the authentication cryptogram 3 affixed to the payment card 1, with a digital reference image of the authentication cryptogram. This reference image is stored in the secure digital space 6 of the bank account. When the reference image corresponds to cryptogram 3 affixed on the payment card, the second authentication step is considered to be successful.

In the event of the second authentication step failing, the secure transaction can immediately be aborted, however, the method can allow the bearer 100 of the payment card to attempt a determined number of recognition tests. For example, it is possible to offer three authentication cryptogram 3 recognition tests before the secure transaction is interrupted due to failure of the two-factor authentication of the payment card 1 and the identity of its bearer 100. In the event of a first failure, it is also possible to switch to more conventional authentication methods such as the secure 3D system described in the introduction of this document.

However, in the event of the second authentication step d), the authentication method comprises a step of finalizing the secure operation relating to personal data of the bearer 100 of the payment card 1. The finalizing step is denoted e). In practice, the finalizing step transmits the authorizations to proceed with said secure transaction.

Additionally, the authentication method may comprise a step of geolocation of the digital terminal 5 of the bearer 100 of the payment card 1. The location of the bearer 100 of the payment card 1 can give information regarding a fraud attempt. Indeed, if the digital terminal 5 is located in a different country from that wherein the bank account has been opened, this can generate an alert sent to the bearer 100. In practice, the recognition module 50 is configured to have access to the location data of the digital terminal 5. Alternatively, the IP address of the digital terminal 5 can make it possible to give information about the geolocation of the bearer 100 of the payment card 5.

In brief, the purpose of this geolocation is to ensure that the entry of the security data 20, 21, 22, 23, 24, 200, 201, 203 of the payment card 1 and the recognition of the authentication cryptogram 3, in particular of the QR Code® are carried out from the same place.

According to a first example embodiment shown in FIG. 5, when the first authentication step a) is carried out following a connection to a secure digital space of a secure online portal 7 separate from the secure digital space 6. This possibility is very common, it corresponds to a purchase made by the bearer 100 of the payment card 1 on the online portal 7 of a merchant site. According to this example, the bearer 100 enters the security data 20, 21, 22, 23, 24, 200, 201, 203 directly into the secure digital space of the online portal 7.

The request step b) is carried out through a secure communication channel which is open between the online portal 7 and the secure digital space 6. This channel may be that already used between a payment service provider and a bank.

In this situation, the finalizing step e) also takes place through this secure communication channel. When the online portal 7 is a payment portal of a merchant website, the finalizing step e) consists in transmitting the debit authorizations between the banking institution of the payment card 1 and a banking institution to which the payment portal is assigned. The online portal 7 may also request a digital signature that will be provided through the authentication method of the invention. In this case, the validation step e) transmits an authorization or a digital signature.

According to a second example embodiment of the method shown in FIG. 6, the first authentication step a) is carried out following a connection to the secure digital space 6 linked to the bank account of the payment card 1. According to this example, the bearer 100 identifies themselves to the secure digital space 6. In practice, the bearer 100 authenticates themselves by entering their identity, via an identifier. This identifier is verified by means of a password and/or by biometric recognition (digital or facial recognition).

According to this example, the request step b) is carried out within the secure digital space 6. In this situation, the finalizing step e) takes place directly from the banking institution, for example to perform an internal banking movement, that is to say, between two bank accounts opened with the same institution. These two bank accounts can belong to the same bearer 100 or to two different entities. Alternatively, when a financial transaction between two banking organizations is concerned, the finalizing step consists of transferring the authorizations to debit the bank account of the bearer 100 of the payment card 1 and to deposit into a receiving banking institution.

We claim:

1. An authentication system, comprising:

a payment card being comprised of a front side, a back side, and an electronic chip, said payment card being linked to a bank account of a bearer to whom said payment card belongs, wherein said front side is comprised of security data comprising at least one primary account number (PAN number), an identity of said bearer, and an expiration date of said payment card, wherein said back side is comprised of a card verification code (CVV code) being comprised of three digits; and an authentication cryptogram being unique to said payment card and being affixed to said payment card; and a digital terminal belonging to the bearer and having a digital recognition module in communication with a secure digital space so as to identify said authentication cryptogram in said secure digital space by optical recognition through said digital terminal and finalize a secure operation relating to the bank account.

2. The authentication system, according to claim 1, wherein said authentication cryptogram is comprised of a matrix code having a determined number of black modules arranged against a white background so as to form a unique pattern, each black module of said number of black modules forming a character of said authentication cryptogram.

3. The authentication system, according to claim 1, wherein the PAN number is comprised of four series of four digits, and wherein the PAN number is displayed on said payment card as a primary account number cryptogram (PAN cryptogram) being comprised of at least one replacement series of four digits and respective remaining series of four digits of said four series of four digits of said PAN number.

4. The authentication system, according to claim 3, wherein said PAN cryptogram comprises between 16 and 100 characters.

5. The authentication system, according to claim 3, wherein said PAN cryptogram is a Cardan grille.

6. The authentication system, according to claim 1, wherein said CVV code is comprised of a card verification cryptogram (CVV cryptogram) having a number of characters greater than three.

7. The authentication system, according to claim 1, wherein said authentication cryptogram comprises a number of characters between 200 and 10,000.

8. A method for performing secure operations, comprising the steps of:

entering security data of the payment card of the authentication system, according to claim 1, into a secure online portal;

sending a request for said secure operation from said secure online portal to said secure digital space being stored on a remote server managed by a banking institution linked to the bank account of the bearer;

verifying said entered security data with said banking institution by comparing said entered security data with reference data stored in said secure digital space as a first authentication;

recognizing said authentication cryptogram through said digital recognition module of said digital terminal as a second authentication in said secure digital space;

and finalizing said secure operation by approving the request for said secure operation from said secure online portal with said secure digital space.

9. The method for performing secure operations, according to claim 8, wherein the step of recognizing said authentication cryptogram further comprises the steps of:

opening a secure communication channel between said secure digital space and said digital terminal; and calling with said secure digital space for opening of said digital recognition module.

10. The method for performing secure operations, according to claim 9, wherein the step of recognizing said authentication cryptogram further comprises the steps of:

opening said digital recognition module by a biometric and/or code authentication transaction of the bearer on said digital terminal;

giving access to a camera of said digital terminal to said digital recognition module, after the step of opening of said digital recognition module, so as to allow a digital capture of said authentication cryptogram.

11. The method for performing secure operations, according to claim 10, wherein the step of recognizing said authentication cryptogram further comprises the step of:

comparing said digital capture of said authentication cryptogram with a digital reference image of said authentication cryptogram stored in said secure digital space.

12. The method for performing secure operations, according to claim 8, wherein said secure online portal is separate from said secure digital space, and wherein the step of sending said request for said secure operation is comprised of the step of:

opening a secure communication channel between said secure online portal and said secure digital space.

13. The method for performing secure operations, according to claim 8, wherein the step of recognizing said authentication cryptogram further comprises the step of:

geolocating said digital terminal.

14. The method for performing securing operations, according to claim 8, wherein said secure operation is a remote payment carried out via a website as said secure online portal.

* * * * *